United States Patent
Hauquitz et al.

(10) Patent No.: US 9,436,068 B2
(45) Date of Patent: Sep. 6, 2016

(54) PORTABLE CONSTANT RESOLUTION VISUAL SYSTEM (CRVS) WITH DEFINED THROW DISTANCE

(71) Applicant: The Boeing Company, Chicago, IL (US)

(72) Inventors: Eric L. Hauquitz, O'Fallon, MO (US); Scott P. Rothman, O'Fallon, MO (US)

(73) Assignee: THE BOEING COMPANY, Chicago, IL (US)

( * ) Notice: Subject to any disclaimer, the term of this patent is extended or adjusted under 35 U.S.C. 154(b) by 80 days.

(21) Appl. No.: 14/488,550

(22) Filed: Sep. 17, 2014

(65) Prior Publication Data
US 2016/0077413 A1   Mar. 17, 2016

(51) Int. Cl.
G03B 21/10 (2006.01)
G03B 21/28 (2006.01)
G03B 21/60 (2014.01)
G03B 21/14 (2006.01)
G03B 21/20 (2006.01)

(52) U.S. Cl.
CPC ............. *G03B 21/10* (2013.01); *G03B 21/145* (2013.01); *G03B 21/28* (2013.01); *G03B 21/60* (2013.01); *G03B 21/2066* (2013.01)

(58) Field of Classification Search
CPC  G03B 21/28; G03B 21/145; G03B 21/2066; H04N 5/2352; H04N 5/2354
See application file for complete search history.

(56) References Cited

U.S. PATENT DOCUMENTS

| 8,194,193 | B2 | | 6/2012 | Streid et al. | |
|---|---|---|---|---|---|
| 8,277,055 | B2 | * | 10/2012 | Kuhlman | B60K 35/00 353/11 |
| 8,690,353 | B2 | * | 4/2014 | Hung | G03B 17/54 345/9 |
| 8,690,358 | B2 | * | 4/2014 | Larsen | H04N 5/66 348/208.4 |
| 8,944,612 | B2 | * | 2/2015 | Chang | G03B 21/13 349/5 |
| 2007/0258233 | A1 | * | 11/2007 | Gray | F21S 8/02 362/148 |
| 2010/0123880 | A1 | * | 5/2010 | Oren | G09B 9/32 353/98 |
| 2010/0141902 | A1 | * | 6/2010 | Destain | G03B 21/14 353/69 |
| 2011/0211175 | A1 | * | 9/2011 | Stehle | G02B 17/0652 353/98 |

OTHER PUBLICATIONS

"Constant Resolution Visual System. Advanced Display Technology 360 of Immersion," The Boeing Company, 2012.*
"Constant Resolution Visual System. Advanced Display Technology 360° of Immersion," The Boeing Company, 2 pages, http://www.boeing.com/assets.pdf/defense-space/support/training/product_cards/crvs.pdf (2012).

* cited by examiner

*Primary Examiner* — Sultan Chowdhury
(74) *Attorney, Agent, or Firm* — Thompson Hine LLP

(57) ABSTRACT

A portable constant resolution visual system (CRVS) is disclosed. The CRVS includes a screen display having a uniform resolution screen curvature, a projector for generating images that are shown on the display screen, a mirror and a frame. The mirror may be positioned relative to the screen and the projector to reflect images generated by the projector onto the display screen. A throw distance is measured between the projector and the display screen and is based on a specific design eye point and a field of view (FOV). The frame supports the screen display, the projector, and the mirror. The frame may have a plurality of bars that define the throw distance between the projector and the display screen.

19 Claims, 3 Drawing Sheets

PORTABLE CONSTANT RESOLUTION VISUAL SYSTEM (CRVS) WITH DEFINED THROW DISTANCE

FIELD

The disclosed system relates to a constant resolution visual system (CRVS) and, more particularly, to a portable CRVS having a frame that sets a defined throw distance between a display screen and a projector.

BACKGROUND

A simulator is a device that may simulate a specific experience as realistically as possible. For example, flight simulators may re-create the experience of flying an aircraft. A vehicle simulator may re-create the experience of driving a vehicle on a street, or on an off-road terrain. Simulators typically use a display system that creates a field of view (FOV), which shows what a user may see if actually performing the activity (i.e., flying the aircraft, or driving a vehicle). In particular, the simulator may include a display screen and a projector, where the projector generates an image that is shown upon the display screen.

The simulators currently available are relatively large in size, and therefore difficult to transport from one location to another location. As a result, it may be challenging to easily and quickly install a simulator in a specific location, such as a classroom. For example, some simulators include several large components that are generally secured to the floor after being aligned with respect to one another. Thus, proper alignment between the components is maintained after the initial alignment is performed. Therefore, while the components may be repositioned via wheels or other devices during the initial installation of the simulator, the simulator is configured to be permanently secured to the floor in a fixed location to maintain the proper alignment between the components. Moreover, since the simulator is large, it is often impractical to place the simulator in a place where space is limited. Simulators are also time-consuming to assemble and install. It may take at least several days to assemble and install a simulator in a classroom. Finally, it may also be expensive to install a simulator. This is because only qualified personnel who have specialized knowledge or training are typically able to assemble and install a simulator. Therefore, there is a continued need in the art for a portable simulator that is relatively simple and inexpensive to assemble and install.

SUMMARY

In one aspect, a portable constant resolution visual system (CRVS) is disclosed. The CRVS includes a screen display having a uniform resolution screen curvature, a projector for generating images that are shown on the display screen, a mirror and a frame. The mirror may be positioned relative to the screen and the projector to reflect images generated by the projector onto the display screen. A throw distance is measured between the projector and the display screen and is based on a specific design eye point and a field of view (FOV). The frame supports the screen display, the projector, and the mirror. The frame may have a plurality of bars that define the throw distance between the projector and the display screen.

In another aspect, a method of assembling a constant resolution visual system (CRVS) is disclosed. The method includes joining a plurality of bars to another in order to define a frame of the CRVS. The method also includes positioning a screen display having a uniform resolution screen curvature, a projector for generating images that are shown on the display screen, and a mirror positioned relative to the screen and the projector on the frame. The mirror reflects images generated by the projector onto the display screen. The frame defines a throw distance measured between the projector and the display screen. The throw distance may be based on a specific design eye point and a field of view (FOV).

Other objects and advantages of the disclosed method and system will be apparent from the following description, the accompanying drawings and the appended claims.

DETAILED DESCRIPTION

Figure 1:
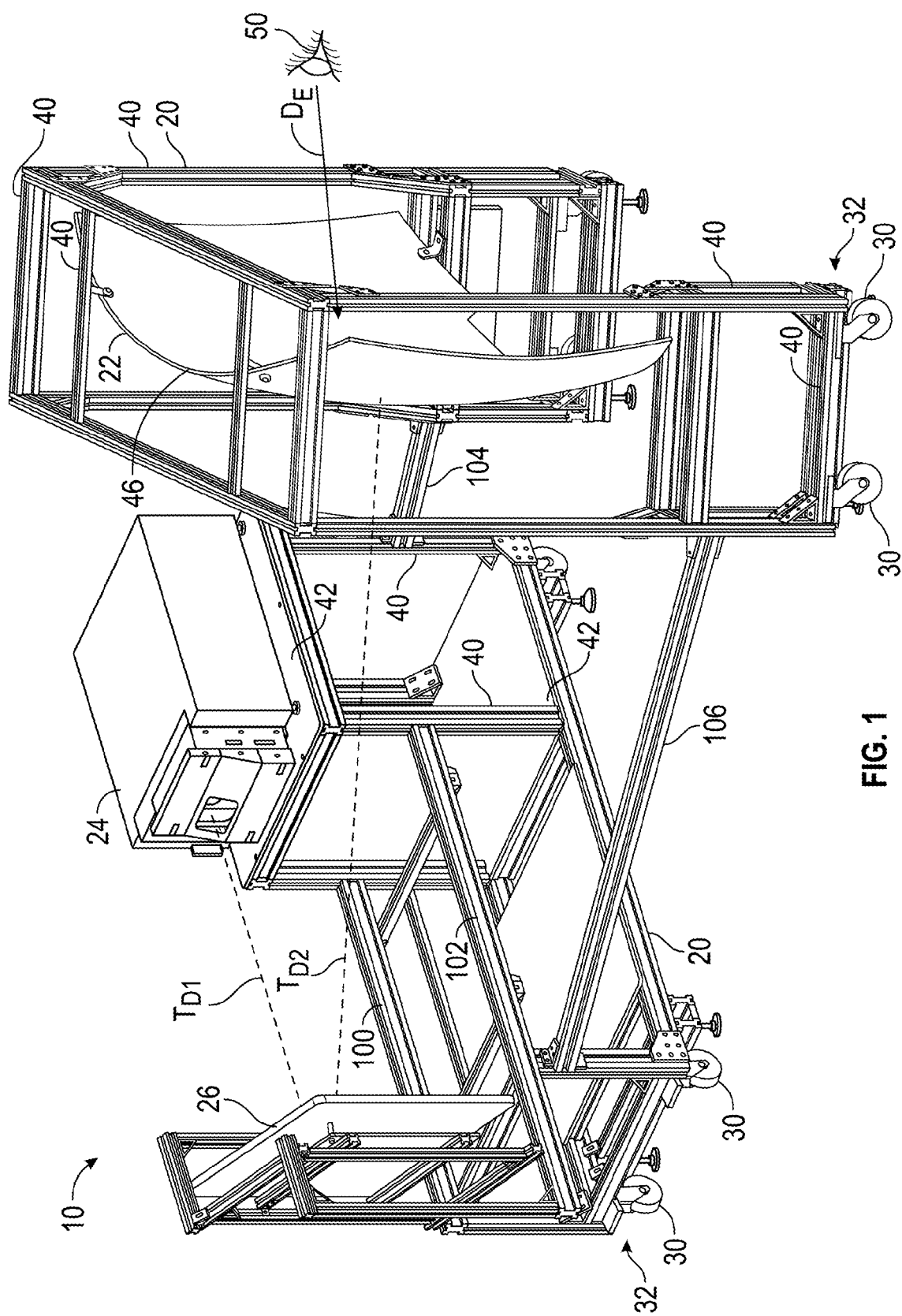
FIG. 1 is a schematic view of an exemplary constant resolution visual system (CRVS) including a projector, a mirror, and a screen.

As shown in FIG. 1, the disclosed constant resolution visual system (CRVS) 10 according to an aspect of the disclosure may include a frame 20 that provides support to various components of the CRVS 10. Specifically, the frame 20 may support a display screen 22, a projector 24, and a mirror 26. In the embodiment as shown, a plurality of coasters or wheels 30 may be attached to a bottom portion 32 of the frame 20. The wheels 30 allow for the CRVS 10 to be easily transported by a user from one location to another location. As explained below, the frame 20 may be composed of a plurality of rails or bars 40. The frame 20 may also include one or more shelves 42 that provide support to various components, such as the projector 24. The CRVS 10 may be used in a variety of applications and may service, for example, unmanned vehicle operations, part-task or squadron level trainers, refueling-boom operator trainers, high-performance racing simulators, heavy equipment operator trainers, military ground force tactical trainers, first person gaming systems, or ship control simulators.

The display screen 22 may be a rear projection screen. In the embodiment as shown, the display screen 22 includes a uniform resolution screen curvature 46 that creates a substantially constant or uniform resolution upon the display screen 22. The uniform resolution screen curvature 46 maps equal sized pixels from the projector 24 to equal angles as viewed from a design eye point 50. Referring to both FIGS. 1 and 2, The design eye point 50 defines a distance $D_E$ between a viewer or user and the display screen 22. A field of view (FOV) of the user (seen in FIG. 2) may be the area that defines the viewing angles as seen by the user. The FOV may be expressed in terms of horizontal and/or vertical degrees. For example, in one non-limiting embodiment the display screen 22 may include an FOV having a length and width of about 110 degrees by about 64 degrees.

The overall dimensions as well as the uniform resolution screen curvature 46 of the display screen 22 may be based upon the specific design eye point 50 distance, as well as the FOV. In other words, the display screen 22 may accommodate a specific design eye point 50 as well as FOV in order to create a substantially uniform resolution upon the display screen 22. Those skilled in the art will readily appreciate that the design eye point 50 and the FOV are typically design requirements that may be requested by a customer. The CRVS 10 may be designed to accommodate the specific design eye point 50 and FOV as requested by the customer.

Figure 2:
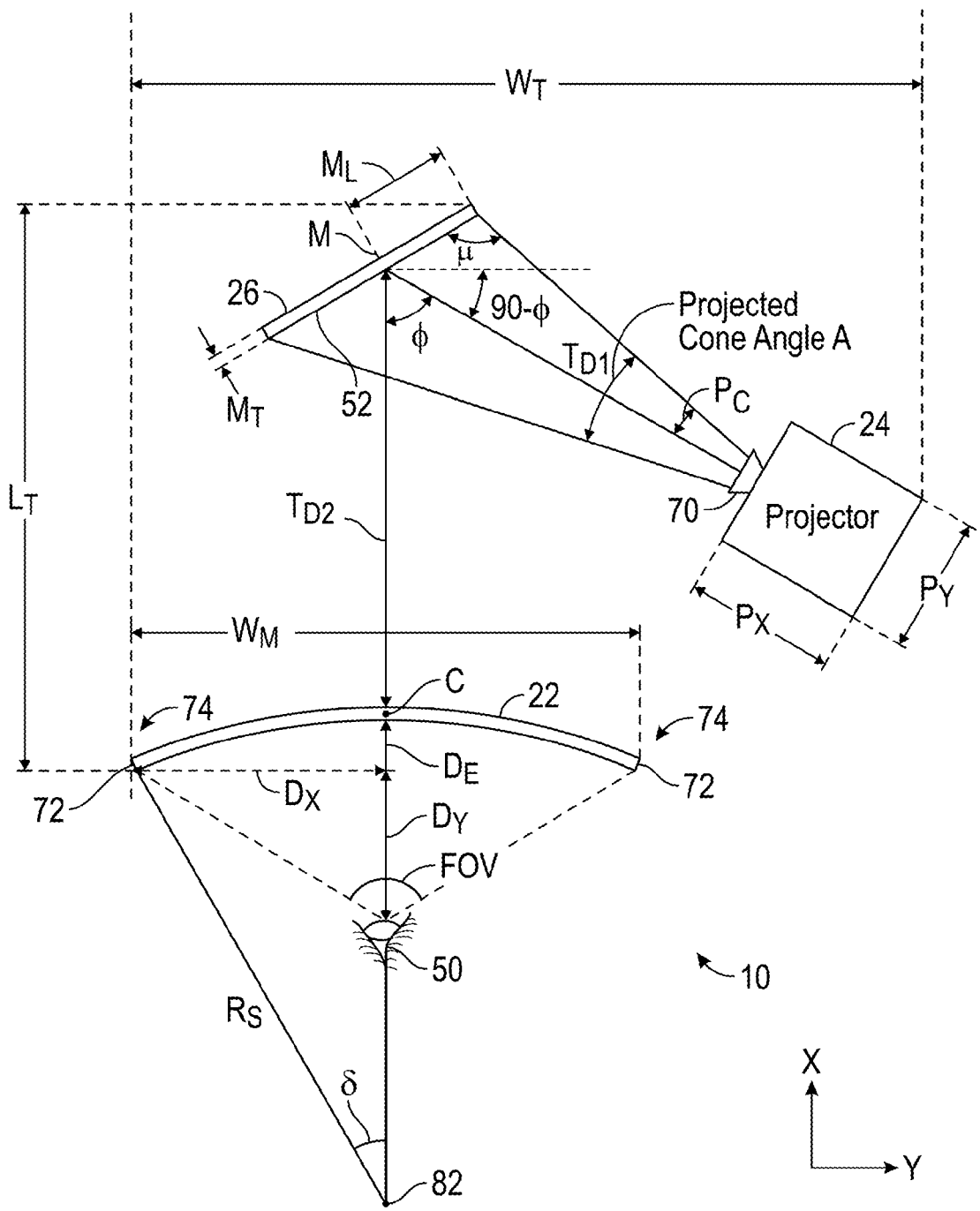
FIG. 2 is a schematic diagram of the CRVS shown in FIG. 1, illustrating the positional relationships between the projector, the mirror, and the screen.

Continuing to refer to both FIGS. 1 and 2, the design eye point 50 and the FOV may also determine a projection distance, which is also referred to as a throw distance. The throw distance may represent the distance between the projector 24 and the display screen 22. In the embodiment as shown, the throw distance may be broken up or sectioned into two different segments. Specifically, the throw distance may be broken up into a first throw distance $T_{D1}$ which represents the distance between the projector 24 and the mirror 26, as well as a second throw distance $T_{D2}$, which represents the distance between the display screen 22 and the mirror 26. In particular, the first throw distance $T_{D1}$ may be measured from the projector 24 to a point M of the mirror 22. The second throw distance $T_{D2}$ may be measured from the point M of the mirror 22 to a center point C of the projection screen 22.

The projector 24 may be any device for generating images shown on the display screen 22 such as, for example, a fixed matrix high definition format projector. The mirror 26 reflects images generated by the projector 24 onto the display screen 22. In one embodiment, the mirror 26 may be a first surface mirror, where light is reflected off a mirrored surface 52 (seen in FIG. 2) of the mirror 26. A first surface mirror may also be referred to as a front surface mirror, which is a mirror with the mirrored surface 52 being above a backing (not shown in the figures) as opposed to a conventional, second surface mirror where a reflective surface is behind a transparent substrate such as glass or acrylic. The grade or quality of the mirrored surface 52 may be determined by a specific or desired resolution of the image that is shown upon the display screen 22. Although a substantially flat mirror is illustrated in the figures, those skilled in the art will readily appreciate that a curved mirror may be used in an alternative embodiment as well. However, in the event a curved mirror is used, it is to be understood that a magnification ratio that is associated with a curved mirror may need to be taken into account. The mirror 26 may be used to break up or reduce the throw distance between the display screen 22 and the projector 24.

Turning now to FIG. 2, the CRVS 10 includes an overall or total length $L_T$ as well as an overall or total width $W_T$. The total footprint or area required by the CRVS 10 may be defined by the total length $L_T$ and total width $W_T$. In one exemplary embodiment, the overall length $L_T$ may be about 3.04 meters (ten feet) and the total width $W_T$ may also be about 3.04 meters (i.e., the footprint of the CRVS 10 is 10'×10'). However, those skilled in the art will appreciate that other dimension may be used as well. Moreover, it is also to be understood that the total footprint of the CRVS 10 may be relatively small when compared to some other types of CRVS systems currently available which do not use a mirror to break up the throw distance.

As seen in FIG. 2, a tubular shroud 70 of the projector 24 may focus a light beam at a projected cone edge angle A upon the mirrored surface 52 of the mirror 26. Half of the projected cone edge angle is represented by reference character $P_C$. A throw distance angle φ may be measured between the first throw distance $T_{D1}$ and the second throw distance $T_{D2}$. It is to be understood that the throw distance angle φ may be any angle that is more than zero degrees and that is less than about one hundred and eighty degrees. However, those skilled in the art will readily appreciate that the projector 24 should be placed in relation to the display screen 22 and the mirror 26 such that the projector 24 does not cast a shadow upon the display screen 22.

The mirror 26 includes a mirror thickness $M_T$ as well as a mirror length $M_L$. As seen in FIG. 2, the mirror length $M_L$ may represent a contributing length of the total length $L_T$ of the CRVS 10, or the length of the mirror 26 on one side. The display screen 22 may include a minimum width $W_m$. The minimum width $W_m$ may be measured between two edges 72 located at opposing ends 74 of the display screen 22.

A radius point 82 represents a radius $R_s$ of the uniform resolution screen curvature 46 of the display screen 22. As seen in FIG. 2, the radius point 82 may be aligned in an x-direction with the design eye point 50. An x-direction distance $D_x$ represents the distance in the x-direction between the design eye point 50 and one of the edges 72 of the display screen 22, and a y-direction distance $D_y$ represents the y-direction distance between the design eye point 50 and one of the edges 72 of the display screen 22. It is to be understood that the minimum width $W_m$ of the display screen 22 may be twice the x-direction distance $D_x$ (i.e., $W_m = 2 D_x$).

An angle δ may be measured at the radius point 82, and represents the angle created between one of the edges 72 of the display screen 22 and the center point C of the display screen 22. The relationship between the vertical FOV 80, the x-direction distance $D_x$, the y-direction distance $D_y$, and the radius $R_s$ of the display screen 22 may be expressed by Equations 1 and 2:

$$R_s \sin(\delta) = D_x \quad \text{Equation 1}$$

$$D_y \tan\left(\frac{FOV}{2}\right) = D_x \quad \text{Equation 2}$$

The distance resolving the curve of the uniform resolution screen curvature 46 of the display screen 22 may be expressed by Equation 3:

$$R_s - R_s \cos(\delta) \quad \text{Equation 3}$$

The design eye distance $D_E$ may be determined based on the y-direction distance $D_y$, the radius $R_s$ of the display screen 22, and the angle δ between one of the edges 72 of the display screen 22 and the center point C of the display screen 22. The design eye point distance $D_E$ may be calculated using Equation 4:

$$D_E = R_S - R_S \cos(\delta) + D_y \quad \text{Equation 4}$$

The relationship between the projected cone edge angle of the projector 24, the first projection distance $T_{D1}$, the second projection distance $T_{D2}$, and the radius 82 of the display screen 22 may be expressed by Equation 5. Equation 5 also expresses how the projected cone edge angle $P_C$ may be calculated as well.

$$P_c = \tan^{-1}\left(\frac{D_x}{T_{D1} + T_{D2} + (R_S - R_S \cos(\delta))}\right) \quad \text{Equation 5}$$

Those skilled in the art will readily appreciate that the total throw distance (i.e., the distance between the projector 24 and the display screen 22) by be determined by adding the first projection distance $T_{D1}$ with the second projection distance $T_{D2}$.

Continuing to refer to FIG. 2, an angle μ may be measured between the projected cone edge angle $P_C$ and the mirror 26.

Specifically, the angle μ may be measured between the projected cone edge angle $P_C$ and the mirrored surface 52 of the mirror 26. The angle μ may be determined by Equation 6:

$$\mu = 180 - \left(90 - \frac{\varphi}{2}\right) - P_c \qquad \text{Equation 6}$$

As seen in FIG. 2, the mirror 26 is sized in order to accommodate the projected cone edge angle A. The mirror length $M_L$ may be determined using Equation 7:

$$M_L = \frac{T_{D1}\sin(P_C)}{\sin(\mu)} \qquad \text{Equation 7}$$

The total footprint of the CRVS 10 may be determined by Equations 8, 9, and 10. Specifically, Equation 8 determines the total width $W_T$ of the CRVS 10. Equation 9 determines the total length $L_T$ of the CRVS, assuming that the throw distance angle ϕ is less than ninety degrees. If the throw distance angle ϕ is greater than ninety degrees then the total length $L_T$ of the CRVS 10 may be determined by Equation 10.

$$W_T = D_X + (T_{D1} + P_x)\sin(\varphi) + \frac{P_y}{2}\sin(90 - \varphi) \qquad \text{Equation 8}$$

$$L_T = R_s - R_s\cos(\delta) + T_{D2} + \sin\left(\frac{\varphi}{2}\right)(M_L) + \left(\frac{M_T}{\cos\left(\frac{\varphi}{2}\right)}\right) \qquad \text{Equation 9}$$

(if $\varphi < 90$)

$$L_T = R_s - R_s\cos(\delta) + T_{D2} + \qquad \text{Equation 10}$$
$$(T_{D1} + P_x)\sin(\varphi - 90) + \left(\frac{P_y}{2}\sin(\varphi - 90)\right)$$

The variable $P_x$ represents the width or x-dimension of the projector 24, and the variable $P_y$ represents the height or y-dimension of the projector 24. It should also be noted that the minimum value of the total width $W_T$ of the CRVS 10 may be twice the x-direction distance $D_x$ (i.e., $2D_x$).

Figure 3:
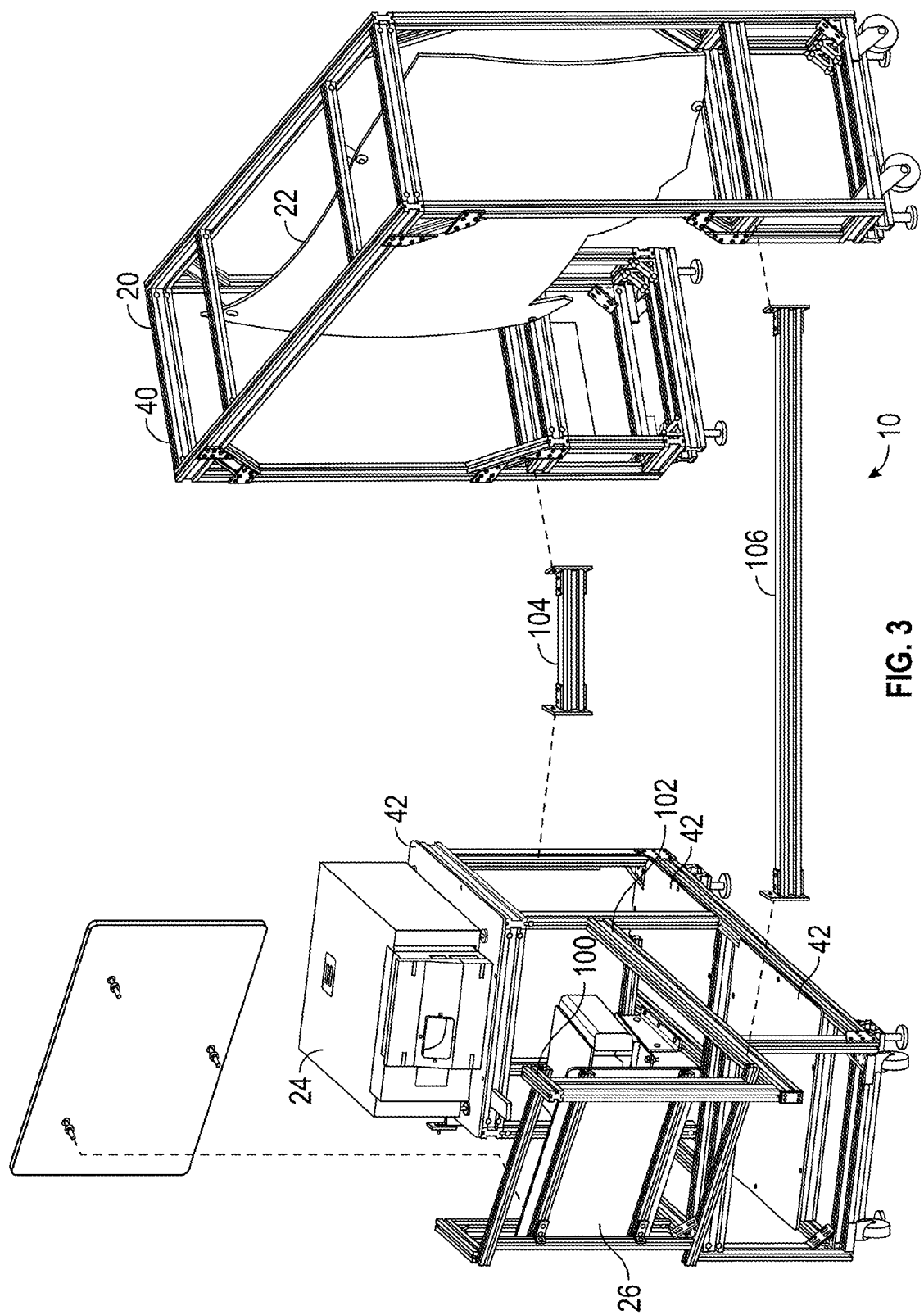
FIG. 3 is an exploded view of a frame of the CRVS shown in FIG. 1.

FIG. 3 is an exploded view of the frame 20 of the CRVS 10. It is to be understood that the CRVS 10 may be shipped or otherwise delivered in a disassembled state as seen in FIG. 3, where the bars 40 of the frame 20 have not been joined to one another. The CRVS 10 may then be assembled by one or more individuals, and into the assembled state as seen in FIG. 1. It is to be understood that instructions may be included with the disassembled CRVS 10. The instructions provide an explanation on how to join or assemble the frame 20 together and into the configuration as seen in FIG. 1. Thus, it is appreciated that a layperson or a person without specialized knowledge or training may be able to easily and quickly assemble the CRVS 10 into the assembled state as seen in FIG. 1. In one exemplary embodiment, the CRVS 10 may be assembled by two individuals in less than four hours.

Referring to both FIGS. 1 and 3, the frame 20 of the CRVS 10 includes the throw distance bars 100, 102, 104, and 106. In particular, first throw distance bars 100, 102 may be used to establish a fixed distance between the projector 24 and the mirror 26. In other words, the first throw distance bars 100, 102 may be used to set the first throw distance $T_{D1}$. Thus, during assembly a user does not need to perform complicated calculations or other computations in order to determine the first throw distance $T_{D1}$ between the projector 24 and the mirror 26. Similarly, the throw distance bars 104, 106 may be used to establish a fixed distance between the mirror 26 and the display screen 22. In other words, the throw distance bars 104, 106 may be used to set the second throw distance $T_{D2}$. Thus, during assembly a user does not need to perform complicated calculations or other steps in order to determine the second throw distance $T_{D2}$ between the mirror 26 and the display screen 22.

During assembly, a user may first join the bars 40 of the frame 20 together. As mentioned above, the CRVS 10 may come with a set of instructions that explains exactly how each of the bars 40 fit together in relation to one another. The user may also attach one or more shelves 42 to the frame 20 of the CRVS 10 as well. Once the frame 20 has been assembled, then a user may attach or otherwise position the display screen 22, the projector 24, and the mirror 26 on the frame 20.

Referring generally to the figures, the disclosed CRVS 10 provides a portable, low-cost, and compact approach for providing a user with a constant resolution display. Portable, as used herein means that the CRVS is capable of being transported relatively easily via the wheels attached to the frame, and the throw bars enable the components to be easily and properly aligned each time the CRVS 10 is assembled at a different location. Moreover, because each of the frames, e.g. the major components in the CRVS, are mounted on movable platforms, the CRVS may be oriented at any direction within the room once the CRVS is assembled and aligned via the throw bars. The disclosed CRVS 10 may be quickly and easily assembled by a layperson or other individual who does not possess any type of specialized knowledge or training because use of the throw bars provides a repeatable and consistent method to enable the layperson to assemble the CRVS in the correct orientation. Moreover, it is also understood that the disclosed CRVS 10 has a relatively small footprint, since the disclosed mirror 26 may be used to break up or reduce the throw distance between the display screen 22 and the projector 24. This in turn allows for the disclosed CRVS 10 to be compact and portable.

While the forms of apparatus and methods herein described constitute preferred aspects of this disclosure, it is to be understood that the disclosure is not limited to these precise forms of apparatus and methods, and the changes may be made therein without departing from the scope of the disclosure.

What is claimed is:

1. A portable constant resolution visual system (CRVS), comprising:
   a screen display having a uniform resolution screen curvature;
   a projector for generating images that are shown on the display screen;
   a mirror positioned relative to the screen and the projector to reflect images generated by the projector onto the display screen, wherein a throw distance is measured between the projector and the display screen and is based on a specific design eye point and a field of view (FOV);
   a frame for supporting the screen display, the projector, and the mirror, the frame having a plurality of bars that define the throw distance between the projector and the display screen; and first throw distance bars that are part of the frame, wherein the first throw distance bars establish a first fixed distance which represents a distance between the projector and the mirror.

2. The CRVS of claim 1, wherein the throw distance is broken up into a first throw distance which represents the distance between the projector and the mirror as well as a second throw distance, which represents the distance between the display screen and the mirror.

3. The CRVS of claim 2, wherein the projector focuses a light beam at a projected cone edge angle upon a mirrored surface of the mirror.

4. The CRVS of claim 3, wherein half of the projected cone edge angle is expressed by the following equation:

$$P_C = \tan^{-1}\left(\frac{D_x}{T_{D1} + T_{D2} + (R_S - R_S\cos(\delta))}\right)$$

wherein $P_C$ is half of the projected cone edge angle, $D_x$ represents the distance in an x-direction between the design eye point and an edge of the display screen, $\delta$ is measured at a radius point of the display screen and represents an angle created between the edge of the display screen and a center point of the display screen, $R_s$ represents a radius of the uniform resolution screen curvature of the display screen, $T_{D1}$ is the first throw distance, and $T_{D2}$ is the second throw distance.

5. The CRVS of claim 4, wherein a total width of the CRVS is determined by the following equation:

$$W_T = D_X + (T_{D1} + P_x)\sin(\varphi) + \frac{P_y}{2}\sin(90 - \varphi)$$

wherein $W_T$ represents the total width, $\varphi$ represents a throw distance angle measured between the first throw distance $T_{D1}$ and the second throw distance $T_{D2}$, $P_x$ represents the x-dimension of the projector, and $P_y$ represents a y-dimension of the projector.

6. The CRVS of claim 4, wherein a total length of the CRVS is determined by the following equation, if the throw distance angle is less than ninety degrees:

$$L_T = R_s - R_s\cos(\delta) + T_{D2} + \sin\left(\frac{\varphi}{2}\right)(M_L) + \left(\frac{M_T}{\cos\left(\frac{\varphi}{2}\right)}\right)$$

wherein $L_T$ is the total length, $\varphi$ represents a throw distance angle measured between the first throw distance $T_{D1}$ and the second throw distance $T_{D2}$, $M_T$ represents a thickness of the mirror, and $M_L$ represents a length of the mirror.

7. The CRVS of claim 4, wherein a total length of the CRVS may be determined by the following equation, if the throw distance angle is greater than ninety degrees:

$$L_T = R_s - R_s\cos(\delta) + T_{D2} + (T_{D1} + P_x)\sin(\varphi - 90) + \left(\frac{P_y}{2}\sin(\varphi - 90)\right)$$

wherein $L_T$ is the total length, $\varphi$ represents a throw distance angle measured between the first throw distance $T_{D1}$ and the second throw distance $T_{D2}$, and $P_y$ represents the y-dimension of the projector.

8. The CRVS of claim 1, wherein the frame comprises second throw distance bars that establish a second fixed distance which represents a distance between the mirror and the display screen.

9. The CRVS of claim 1, comprising a plurality of wheels attached to a bottom portion of the frame.

10. The CRVS of claim 1, wherein the mirror is either substantially flat or curved.

11. The CRVS of claim 1, wherein the mirror is a first surface mirror.

12. The CRVS of claim 1, comprising a set of instructions that provide an explanation how each of the plurality of bars and the first throw distance fit together in relation to one another so as to join the frame together from a disassembled state and into an assembled state.

13. A method of assembling a constant resolution visual system (CRVS), comprising:
joining a plurality of bars to another in order to define a frame of the CRVS;
positioning a screen display having a uniform resolution screen curvature, a projector for generating images that are shown on the display screen, and a mirror positioned relative to both the screen and the projector upon the frame; and
providing first throw distance bars that are part of the frame and establish a first fixed distance which represents a distance between the projector and the mirror, wherein the mirror reflects images generated by the projector onto the display screen, and the frame defines a throw distance measured between the projector and the display screen, the throw distance based on a specific design eye point and a field of view (FOV).

14. The method of claim 13, comprising providing second throw distance bars that are part of the frame and establish a second fixed distance which represents a distance between the mirror and the display screen.

15. The method of claim 13, wherein the throw distance is broken up into a first throw distance which represents the distance between the projector and the mirror and a second throw distance, which represents the distance between the display screen and the mirror.

16. The method of claim 15, comprising focusing a light beam at a projected cone edge angle upon a mirrored surface of the mirror.

17. The method of claim 16, comprising determining half of the projected cone edge angle by the following equation:

$$P_C = \tan^{-1}\left(\frac{D_x}{T_{D1} + T_{D2} + (R_S - R_S\cos(\delta))}\right)$$

wherein $P_C$ is half of the projected cone edge angle, $D_x$ represents the distance in an x-direction between the design eye point and an edge of the display screen, $\delta$ is measured at a radius point of the display screen and represents an angle created between the edge of the display screen and a center point of the display screen, $R_s$ represents a radius of the uniform resolution screen curvature of the display screen, $T_{D1}$ is the first throw distance, and $T_{D2}$ is the second throw distance.

18. The method of claim 13, comprising assembling the CRVS from a disassembled state and into an assembled state by two individuals in a time period of less than four hours based on a set of instructions that provide an explanation how each of the plurality of bars and the first throw distance fit together in relation to one another so as to join the frame together from a disassembled state and into an assembled state.

19. A portable constant resolution visual system (CRVS), comprising:
- a screen display having a uniform resolution screen curvature;
- a projector for generating images that are shown on the display screen;
- a mirror positioned relative to the screen and the projector to reflect images generated by the projector onto the display screen, wherein a throw distance is measured between the projector and the display screen and is based on a specific design eye point and a field of view (FOV);
- a frame for supporting the screen display, the projector, and the mirror, the frame having a plurality of bars that define the throw distance between the projector and the display screen; and
- throw distance bars that are part of the frame, wherein the throw distance bars establish a fixed distance which represents a distance between the mirror and the display screen.

* * * * *